United States Patent
Agarwal et al.

(10) Patent No.: US 10,645,748 B2
(45) Date of Patent: May 5, 2020

(54) RADIO RESOURCE CONTROL (RRC) ENTITY SELECTION FOR RRC MESSAGES

(71) Applicant: QUALCOMM Incorporated, San Diego, CA (US)

(72) Inventors: Ravi Agarwal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 15/892,104

(22) Filed: Feb. 8, 2018

(65) Prior Publication Data
US 2018/0279406 A1 Sep. 27, 2018

Related U.S. Application Data

(60) Provisional application No. 62/475,066, filed on Mar. 22, 2017, provisional application No. 62/475,109, filed on Mar. 22, 2017.

(51) Int. Cl.
*H04W 76/27* (2018.01)
*H04W 72/12* (2009.01)
(Continued)

(52) U.S. Cl.
CPC ........... *H04W 76/27* (2018.02); *H04L 5/0035* (2013.01); *H04L 5/0053* (2013.01); *H04W 72/08* (2013.01);
(Continued)

(58) Field of Classification Search
CPC ..... H04W 76/27; H04W 76/15; H04W 76/16; H04W 72/08; H04W 72/1289; H04L 5/0035; H04L 5/0053
(Continued)

(56) References Cited

U.S. PATENT DOCUMENTS

2011/0222482 A1* 9/2011 Lee .................. H04L 1/189
370/328
2014/0355562 A1 12/2014 Gao et al.
(Continued)

OTHER PUBLICATIONS

Blackberry UK Limited: "RRC Signaling with Bearer Splitting Potential", 3GPP Draft; R2-134108, 3rd Generation Partnership Project (3GPP), Mobile Competence Centre; 650, Route Des Lucioles; F-06921 Sophia Antipolis Cedex; France, vol. RAN WG2, No. San Francisco, USA; Nov. 11, 2013-Nov. 15, 2013, Nov. 13, 2013 (Nov. 13, 2013), XP050736906, pp. 1-5, Retrieved from the Internet: URL:http://www.3gpp.org/ftp/Meetings_3GPP_SYNC/RAN/RAN2/Docs/ [retrieved on Nov. 13, 2013].
(Continued)

*Primary Examiner* — Obaidul Huq
(74) *Attorney, Agent, or Firm* — Linda G. Gunderson; Patterson & Sheridan LLP

(57) ABSTRACT

Certain aspects of the present disclosure relate to methods and apparatus for radio resource control (RRC) entity selection for RRC messages using communications systems operating according to new radio (NR) technologies. Certain aspects provide a method for wireless communication. The method generally includes selecting an RRC entity from a plurality of RRC entities for communicating a RRC message, wherein the plurality RRC entities cooperate to manage radio resources of the UE. The method also includes selecting a link associated with the RRC entity for communicating the RRC message, and transmitting an uplink signaling transmission using the link to the RRC entity.

25 Claims, 17 Drawing Sheets

(51) Int. Cl.
*H04W 72/08* (2009.01)
*H04W 76/16* (2018.01)
*H04L 5/00* (2006.01)
*H04W 76/15* (2018.01)

(52) U.S. Cl.
CPC ....... *H04W 72/1289* (2013.01); *H04W 76/15* (2018.02); *H04W 76/16* (2018.02)

(58) Field of Classification Search
USPC .......................................... 370/310, 328, 329
See application file for complete search history.

(56) References Cited

U.S. PATENT DOCUMENTS

| | | | |
|---|---|---|---|
| 2015/0173044 A1* | 6/2015 | Rinne | H04W 48/16 370/254 |
| 2015/0358937 A1* | 12/2015 | Kazmi | H04W 64/00 455/456.2 |
| 2015/0358957 A1 | 12/2015 | Kim et al. | |
| 2018/0270679 A1* | 9/2018 | Laselva | H04W 24/08 |

OTHER PUBLICATIONS

International Search Report and Written Opinion—PCT/US2018/017563—ISA/EPO—dated Apr. 26, 2018.
3GPP TR 36.842, "3rd Generation Partnership Project; Technical Specification Group Radio Access Network; Study on Small Cell enhancements for E-UTRA and E-UTRAN; Higher layer aspects (Release 12)", Version 12.0.0, Dec. 2013 (Dec. 2013), pp. 1-71.

\* cited by examiner

RADIO RESOURCE CONTROL (RRC) ENTITY SELECTION FOR RRC MESSAGES

CROSS-REFERENCE TO RELATED APPLICATIONS

This application claims priority to U.S. Provisional Application Ser. No. 62/475,066, entitled "RADIO RESOURCE CONTROL (RRC) ENTITY SELECTION FOR RRC MESSAGES," filed on Mar. 22, 2017 and U.S. Provisional Application Ser. No. 62/475,109, entitled "LINK SELECTION FOR RADIO RESOURCE CONTROL (RRC) MESSAGES" filed on Mar. 22, 2017, both of which are expressly incorporated herein by reference in their entirety.

INTRODUCTION

The present disclosure relates generally to communication systems, and more particularly, to methods and apparatus for radio resource control (RRC) entity selection for RRC messages using communications systems operating according to new radio (NR) technologies. Aspects also relate to selecting an RRC link, from a plurality of RRC links for RRC transmissions.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects provide a method for wireless communication by a UE. The method includes receiving a downlink signaling transmission, selecting based, at least in part on the downlink signaling transmission, a radio resource control (RRC) entity from a plurality of RRC entities for communicating a RRC message, wherein the plurality RRC entities cooperate to manage radio resources of the UE, selecting a link associated with the RRC entity for communicating the RRC message, and transmitting the RRC message to the selected RRC entity using the selected link.

Certain aspects provide an apparatus for wireless communication by a UE. The apparatus includes means for receiving a downlink signaling transmission, means for selecting based, at least in part on the downlink signaling transmission, a radio resource control (RRC) entity from a plurality of RRC entities for communicating a RRC message, wherein the plurality RRC entities cooperate to manage radio resources of the UE, means for selecting a link associated with the RRC entity for communicating the RRC message, and means for transmitting the RRC message to the selected RRC entity using the selected link.

Certain aspects provide an apparatus for wireless communication by a UE. The apparatus comprises at least one processor and a memory coupled to the at least one processor. The at least one processor is configured to receive a downlink signaling transmission, select based, at least in part on the downlink signaling transmission, a radio resource control (RRC) entity from a plurality of RRC entities for communicating a RRC message, wherein the plurality RRC entities cooperate to manage radio resources of the UE, select a link associated with the RRC entity for communicating the RRC message, and transmit the RRC message to the selected RRC entity using the selected link.

Certain aspects provide a computer readable medium for wireless communication by a UE having computer-executable instructions stored thereon for receiving a downlink signaling transmission, selecting based, at least in part on the downlink signaling transmission, a radio resource control (RRC) entity from a plurality of RRC entities for communicating a RRC message, wherein the plurality RRC entities cooperate to manage radio resources of the UE, selecting a link associated with the RRC entity for communicating the RRC message, and transmitting the RRC message to the selected RRC entity using the selected link.

Certain aspects provide a method for wireless communication by a UE. The method includes determining at which radio resource control (RRC) entity, from a plurality of RRC entities, a RRC message is needed, selecting an RRC entity from the plurality of RRC entities for communicating the RRC message, wherein the plurality RRC entities cooperate to manage radio resources of the UE, selecting a link associated with the RRC entity for communicating the RRC message, and transmitting the RRC message to the selected RRC entity using the selected link.

Certain aspects provide an apparatus for wireless communication by a UE. The apparatus includes means for determining at which radio resource control (RRC) entity, from a plurality of RRC entities, signaling RRC message is needed, means for selecting an RRC entity from the plurality of RRC entities for communicating the RRC message, wherein the plurality RRC entities cooperate to manage radio resources of the UE, means for selecting a link associated with the RRC entity for communicating the RRC message, and means for transmitting the RRC message to the selected RRC entity using the selected link.

Certain aspects provide an apparatus for wireless communication by a UE. The apparatus comprises at least one processor and a memory coupled to the at least one processor. The at least one processor is configured to determine at which radio resource control (RRC) entity, from a plurality of RRC entities, signaling RRC message is needed, select an RRC entity from the plurality of RRC entities for communicating the RRC message, wherein the plurality RRC entities cooperate to manage radio resources of the UE, select a link associated with the RRC entity for communicating the RRC message, and transmit the RRC message to the selected RRC entity using the selected link.

Certain aspects provide a computer readable medium for wireless communication by a UE having computer-executable instructions stored thereon for determining at which radio resource control (RRC) entity, from a plurality of RRC entities, signaling RRC message is needed, selecting an RRC entity from the plurality of RRC entities for communicating the RRC message, wherein the plurality RRC entities cooperate to manage radio resources of the UE, selecting a link associated with the RRC entity for communicating the RRC message, and transmitting the RRC message to the selected RRC entity using the selected link.

Certain aspects provide a method for wireless communications by a transmit/receive point (TRP). The method includes cooperating with a plurality of RRC entities to manage radio resources of a user equipment (UE), determining, based on the cooperating, an RRC entity from the plurality of RRC entities that is selected to communicate a radio resource control (RRC) message, determining a link associated with the RRC entity for communicating the RRC message, and transmitting a downlink signaling transmission using the determined link.

Certain aspects provide an apparatus for wireless communications by a transmit/receive point (TRP). The apparatus includes means for cooperating with a plurality of RRC entities to manage radio resources of a user equipment (UE), means for determining, based on the means for cooperating, an RRC entity from the plurality of RRC entities that is selected to communicate a radio resource control (RRC) message, means for determining a link associated with the RRC entity for communicating the RRC message, and means for transmitting a downlink signaling transmission using the determined link.

Certain aspects provide an apparatus for wireless communication by a TRP. The apparatus comprises at least one processor and a memory coupled to the at least one processor. The at least one processor is configured to cooperate with a plurality of RRC entities to manage radio resources of a user equipment (UE), determine, based on the cooperation, an RRC entity from the plurality of RRC entities that is selected to communicate a radio resource control (RRC) message, determine a link associated with the RRC entity for communicating the RRC message, and transmitting a downlink signaling transmission using the determined link.

Certain aspects provide a computer readable medium for wireless communication by a TRP having computer-executable instructions stored thereon for cooperating with a plurality of RRC entities to manage radio resources of a user equipment (UE), determining, based on the cooperating, an RRC entity from the plurality of RRC entities that is selected to communicate a radio resource control (RRC) message, determining a link associated with the RRC entity for communicating the RRC message, and transmitting a downlink signaling transmission using the determined link.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
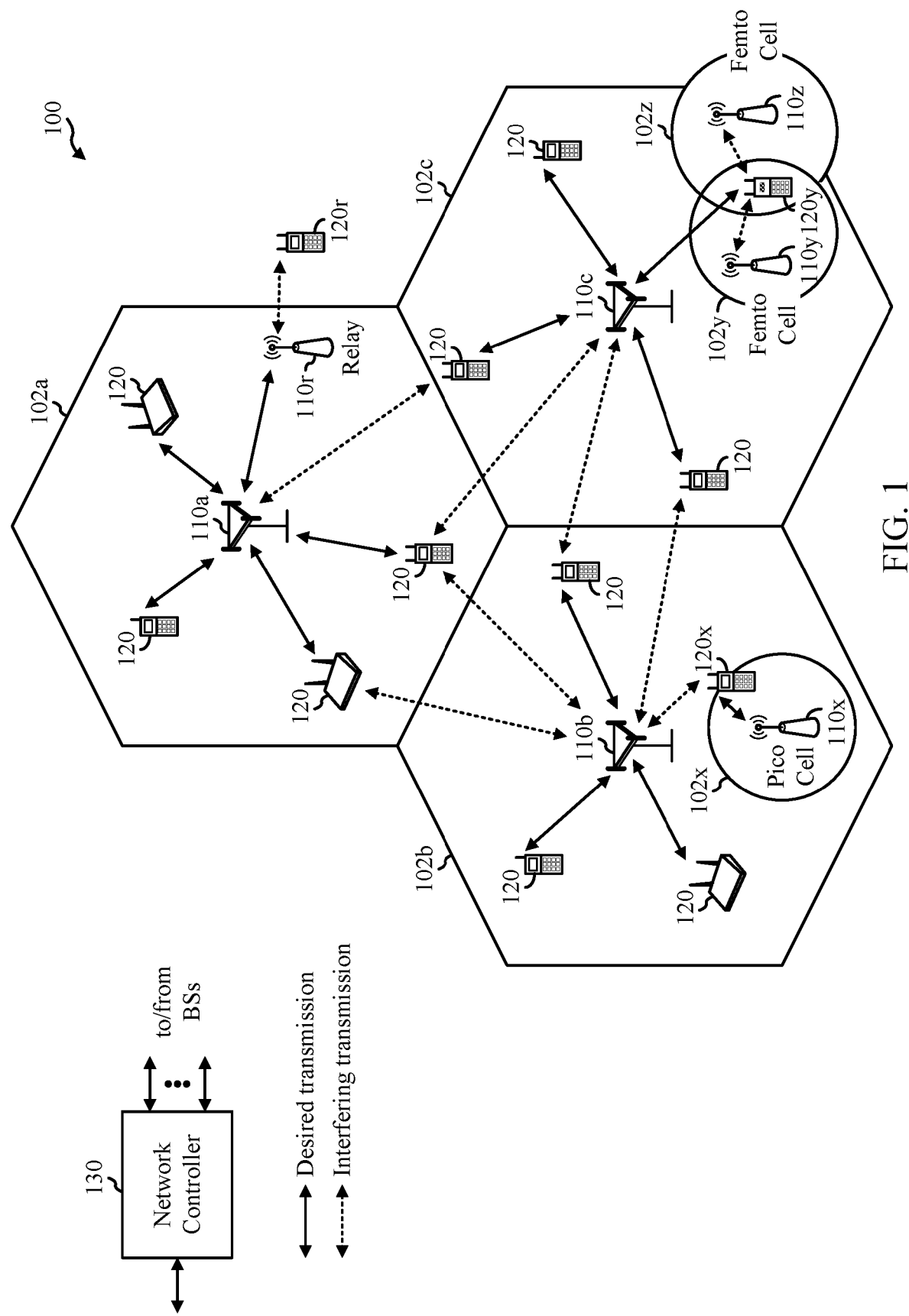
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

In certain scenarios, it may be desirable to transmit signaling messages over a secondary link. As described in more detail herein, in dual connectivity (DC) operation, signaling radio bearers are mapped to a master eNB. According to aspects of the present disclosure, a TRP and UE may select a link used to transmit an UL signaling message, such as an UL RRC message. The links may be selected from one of a first link associated with a master TRP and a second link associated with a secondary TRP. In certain scenarios, the first and second links may be associated with a same RAN node.

Further, in DC, a single RRC entity may be provided at the UE and a single RRC entity may be provided at the network (TRP). As an example, the RRC entity may be provided at the master eNB. Therefore, signaling radio bearers may currently be mapped to the master eNB on the UL and DL. In an effort to more efficiently transmit and receive messages, an RRC entity may be introduced at the secondary TRP. Similarly, a UE may also have a second RRC entity. In this manner, a UE's first RRC entity may be associated with the RRC entity at the master TRP and the UE's second RRC entity may be associated with the RRC entity at the secondary TRP. A determination may be made regarding which RRC entity and link to use to transmit an UL and/or DL RRC message.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
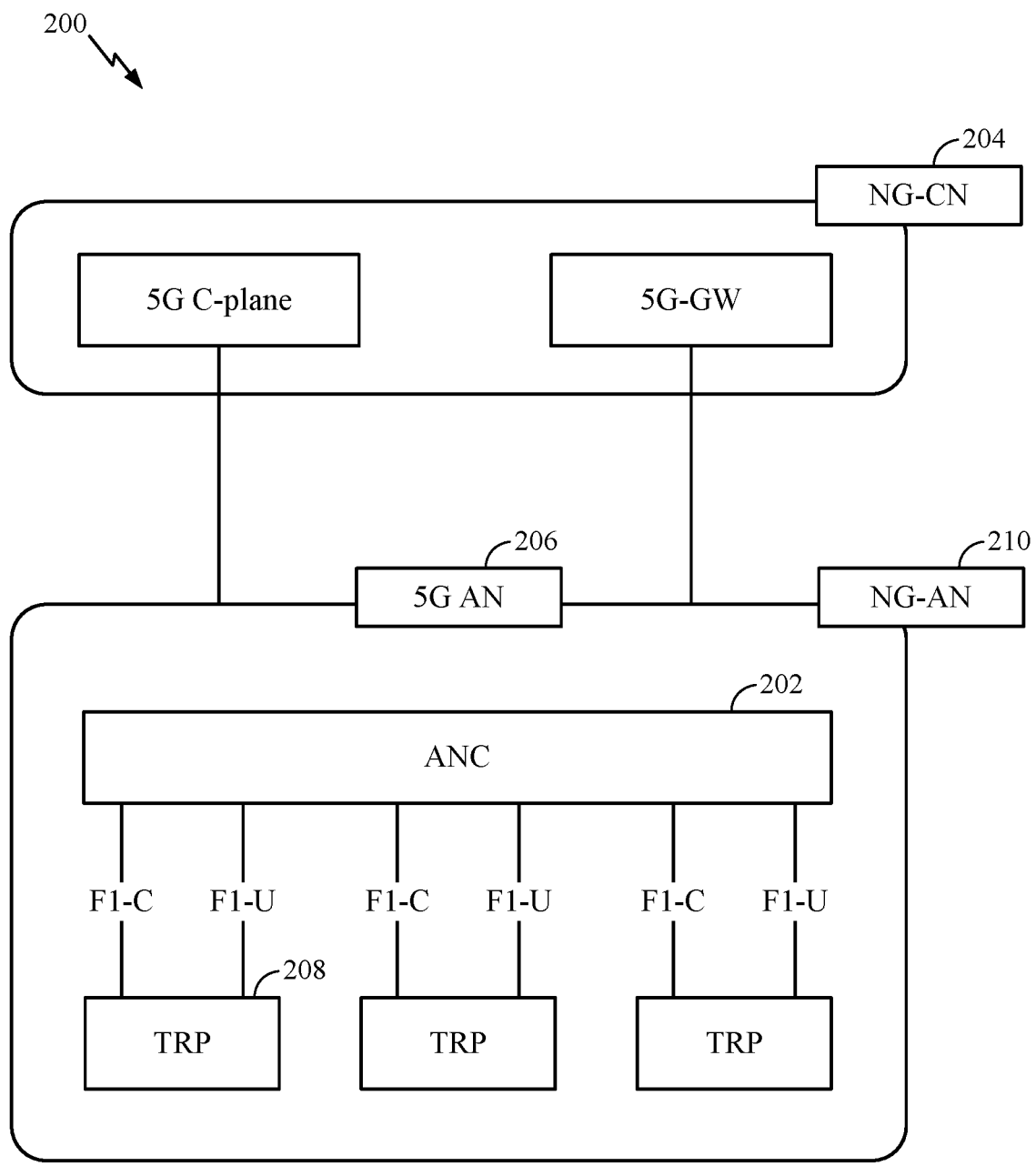
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
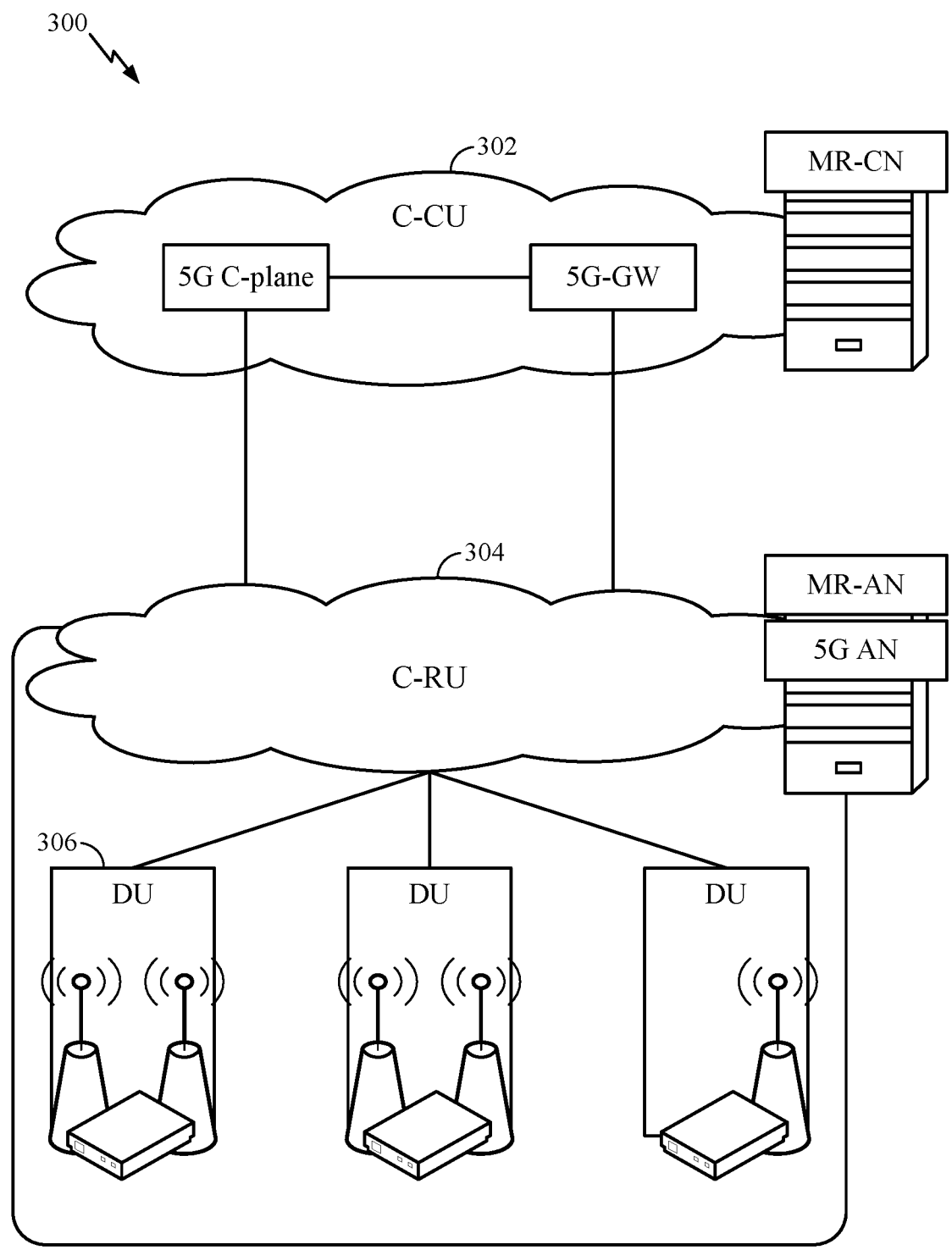
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
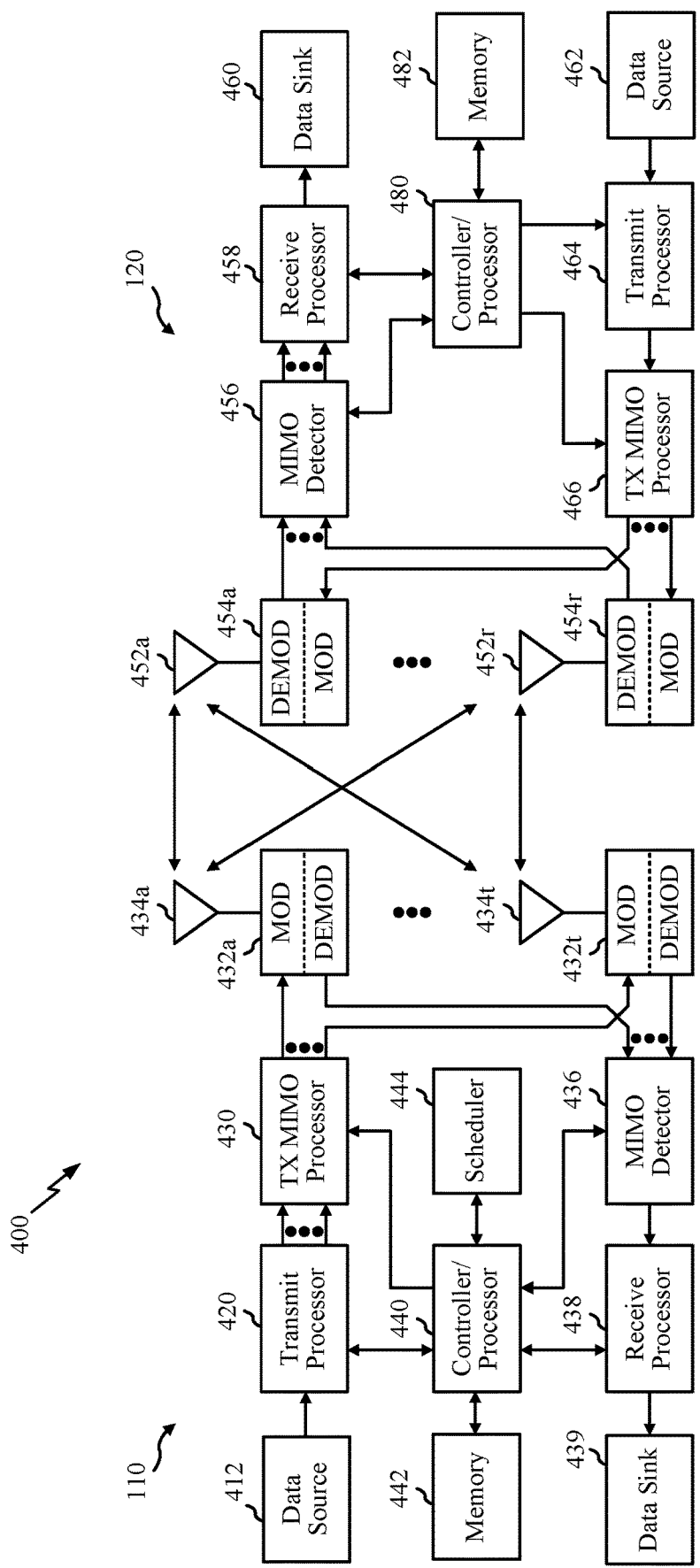
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, modulator/demodulator 454, processors 466, 458, 464, and/or controller/processor 480 of the UE 120 and/or antennas 434, modulator/demodulator 432, processors 420, 430, 438, and/or controller/processor 440 of the BS 110 may be used to perform the operations described herein and illustrated with reference to FIGS. 9-11 and 13-16. Any one or more of the components illustrated in FIG. 4 may provide structural means configured to perform the steps described herein for RRC link and/or RRC entity selection.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct the processes for the techniques described herein for RRC entity and/or RRC link selection. The processor 480 and/or other processors and modules at the UE 120 may also perform or direct processes for the techniques described herein for RRC entity and/or RRC link selection. The memories 442 and 482 may store data and program codes for the BS 110 and the UE 120, respectively. A scheduler 444 may schedule UEs for data transmission on the downlink and/or uplink.

Figure 5:
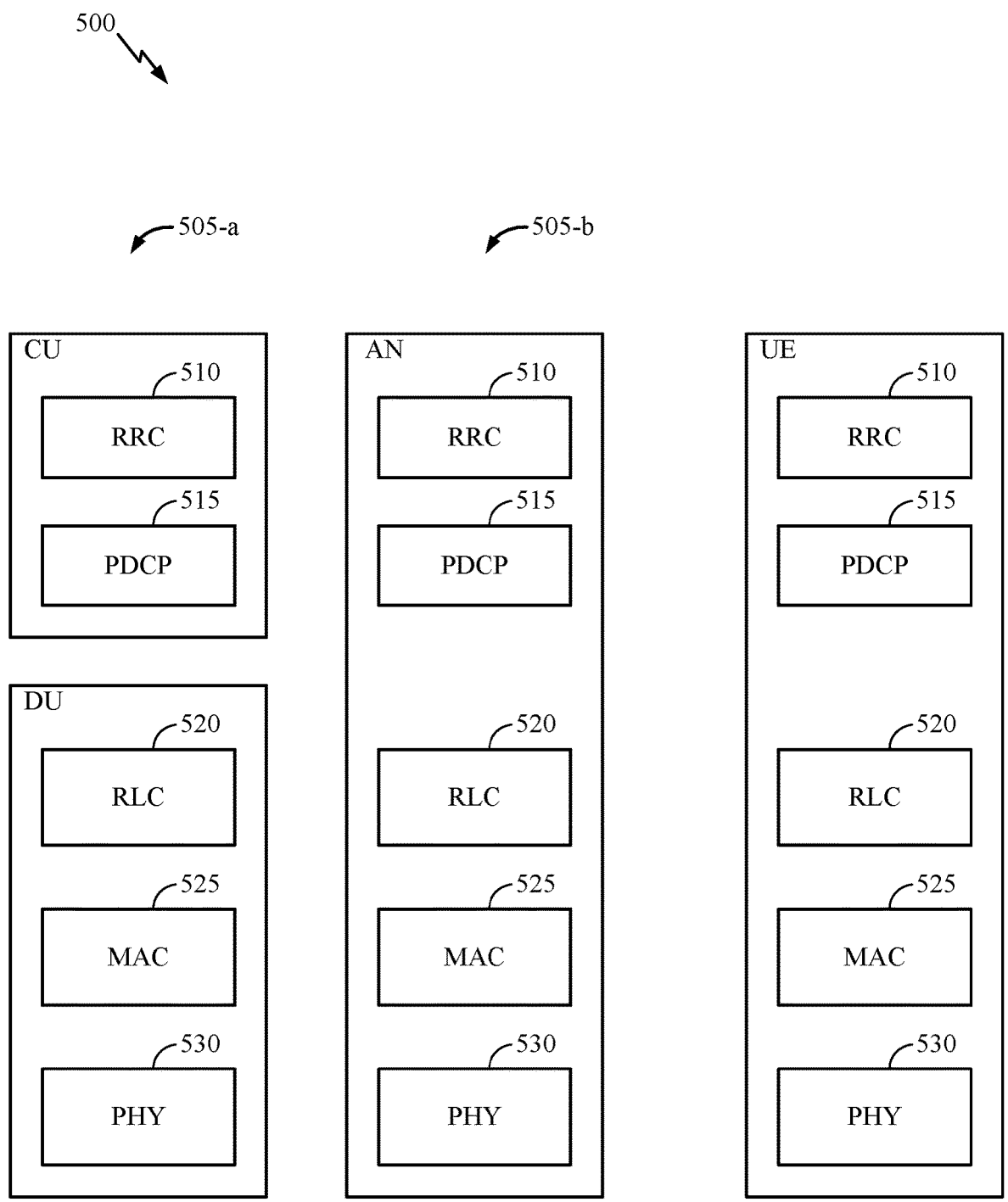
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
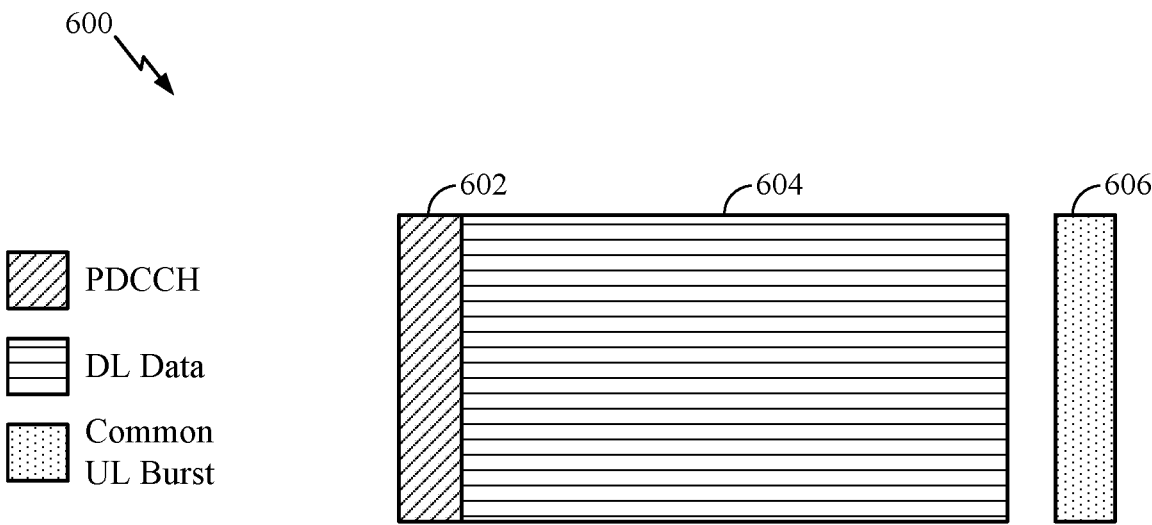
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
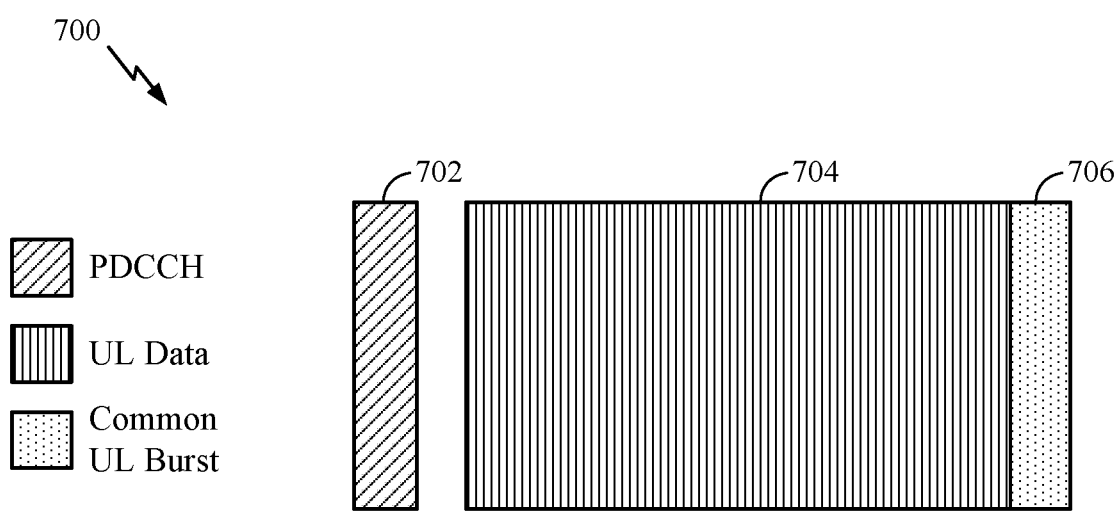
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Dual Connectivity

Presently, mobiles devices may receive data from a TRP; however, users on a cell edge may experience high inter-cell interference which may limit the data rates. Multiflow allows users to receive data from two TRPs simultaneously. For example, the UE sends and receives data from the two TRPs in two separate streams when the UE is in range of two cell towers in two adjacent cells at the same time. The UE communicates with the two towers simultaneously when the UE is on the edge of either towers' reach. By scheduling two independent data streams to the UE from two different TRPs at the same time, multiflow exploits uneven loading in networks. This helps improve the cell edge user experience while increasing network capacity. In one example, throughput data speeds for users at a cell edge may double. "Multiflow" is similar to dual-carrier HSPA, however, there are differences. For example, dual-carrier HSPA does not allow for connectivity to multiple towers to connect simultaneously to a device.

Dual connectivity (DC) may have benefits in the cellular industry. DC can significantly improve per-user throughput and mobility robustness by allowing users to be connected simultaneously to master cell group (MCG) and secondary cell group (SCG) via MeNB (master eNB) and SeNB (secondary eNB), respectively. eNB and gNB (and TRP) are used inter-changeably throughout this description. The increase in per-user throughput is achieved by aggregating radio resources from at least two eNBs. Moreover, dual connectivity also helps in load balancing between MCG and SCG.

The MeNB and SeNB may not be collocated and can be connected via a non-ideal backhaul (e.g., backhaul). Thus, the different eNBs may use different schedulers, etc. For example, the UE may be dually connected to a macro cell and the small cell, and the eNBs may be connected via a non-ideal backhaul and operate on different carrier frequencies. With carrier aggregation multiple LTE/component carriers are aggregated to serve a single unit of LTE Advanced UE.

Figure 8:
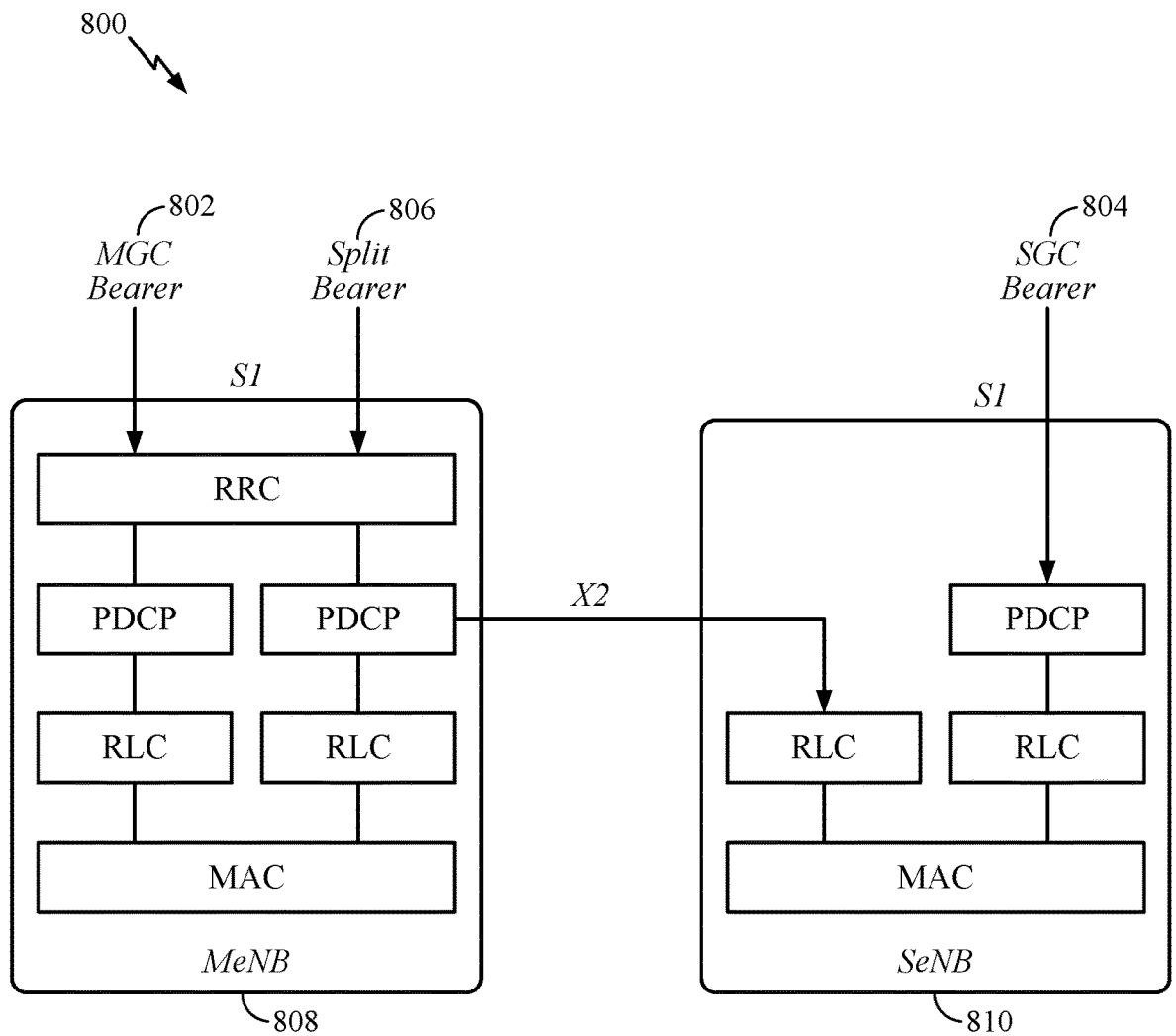
FIG. 8 illustrates an example of a dual connectivity (DC) architecture.

FIG. 8 illustrates an example radio protocol architecture for DC on the DL. As described above, in DC, a given UE consumes radio resources provided by at least two different network points, such as a master and a secondary TRP (e.g., 808 and 810). In DC, the radio protocol architecture that a particular bearer uses depends on how the bearer is setup.

As illustrated in FIG. 8, three bearer types exist: MCG bearer 802 (the group of the serving cells associated with the MeNB), SCG bearer 804 (the group of the serving cells associated with the SeNB), and split bearer 806 (splitting a bearer over multiple eNBs such as the MeNB 808 and SeNB 810).

The RRC is located in MeNB. As such, the single RRC connection terminates at the MeNB. According to one example, an RRC entity is logically present above the PDCP layer at the MeNB 808. The RRC entity transmits DL signaling messages (e.g., RRC messages) to the UE through the MeNB. On the UL, RRC messages are transmitted on the radio link associated with the MeNB. In this manner, presently, signaling radio bearers (SRBs) are configured as MCG bearer type and therefore only use radio resources of the MeNB.

A similar description may apply on the uplink. The MCG bearer refers to a bearer mapped for transmission on the uplink associated with MeNB. The SCG bearer refers to a bearer mapped for transmission on the uplink associated with SeNB. Split bearers are mapped on uplinks associated with both the MeNB and SeNB. Uplink transmission may be dynamically switched between the bearers associated with the MeNB and SeNB.

Example Link Selection for RRC Messages

In DC, SRBs, are mapped to the MeNB on both the uplink and downlink; however, there may be situations where it is desirable to transmit signaling messages over a secondary link (e.g., the link associated with the SeNB) as opposed to the master link. Signaling messages or signaling transmissions may refer to an uplink RRC message or a downlink RRC message.

According to one example, the MeNB may be a 5G node, such as a MgNB operating in the mmWave band and the SeNB may be an LTE node operating in sub-6 GHz band. The 5G network may have spotty coverage as compared to the ubiquitous and reliable LTE coverage. Accordingly, it may be desirable to transmit SRB messages via the SeNB 810 instead of the MgNB 808.

As described herein, split SRBs are one way to enable UL and/or DL signaling transmission via the SeNB. Instead of requiring the SRB to be routed over the MgNB, the PDCP layer of the MgNB may determine routing DL signaling messages via the SeNB. The MgNB may determine whether to transmit signaling messages via the MgNB or the SeNB based on, for example, the coverage of the links and/or the signal quality of the links. On the UL, a DC UE may select one of: a link associated with the MgNB or a link associated with the SeNB to transmit UL signaling messages.

Figure 9:
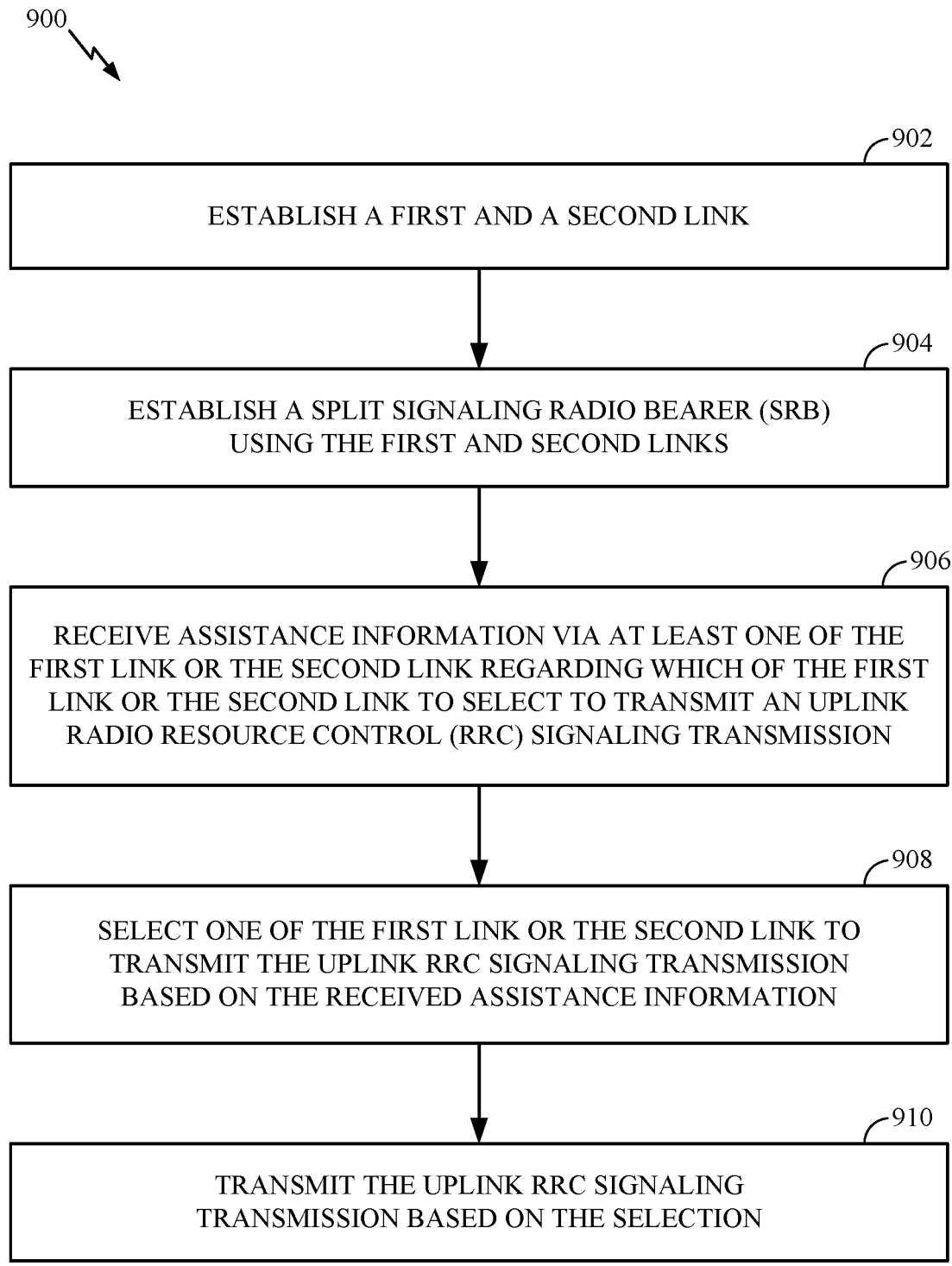
FIG. 9 illustrates example operations for wireless communication performed by a UE, in accordance with aspects of the present disclosure.

FIG. 9 illustrates operations 900 for wireless communications, in accordance with aspects of the present disclosure. The operations 900 may be performed by a UE 120 having one or more components illustrated in FIG. 4.

At 902, the UE may establish a first link and a second link. The first and second links may be associated with a first RAN node and second RAN node, such as, for example, a first TRP and a second TRP. According to aspects, the first and second links may be associated with a same RAN node.

At 904, the UE may establish a split signaling radio bearer (SRB) using the first and second links. At 906, the UE may receive assistance information via at least one of the first link or the second link, wherein the assistance information is associated with which of the first link or the second link to select to transmit an uplink radio resource control (RRC) signaling transmission. At 908, the UE may select one of the first link or the second link to transmit the uplink RRC signaling transmission based on the received assistance information. At 910, the UE may transmit the uplink RRC signaling transmission based on the selection.

Figure 10:
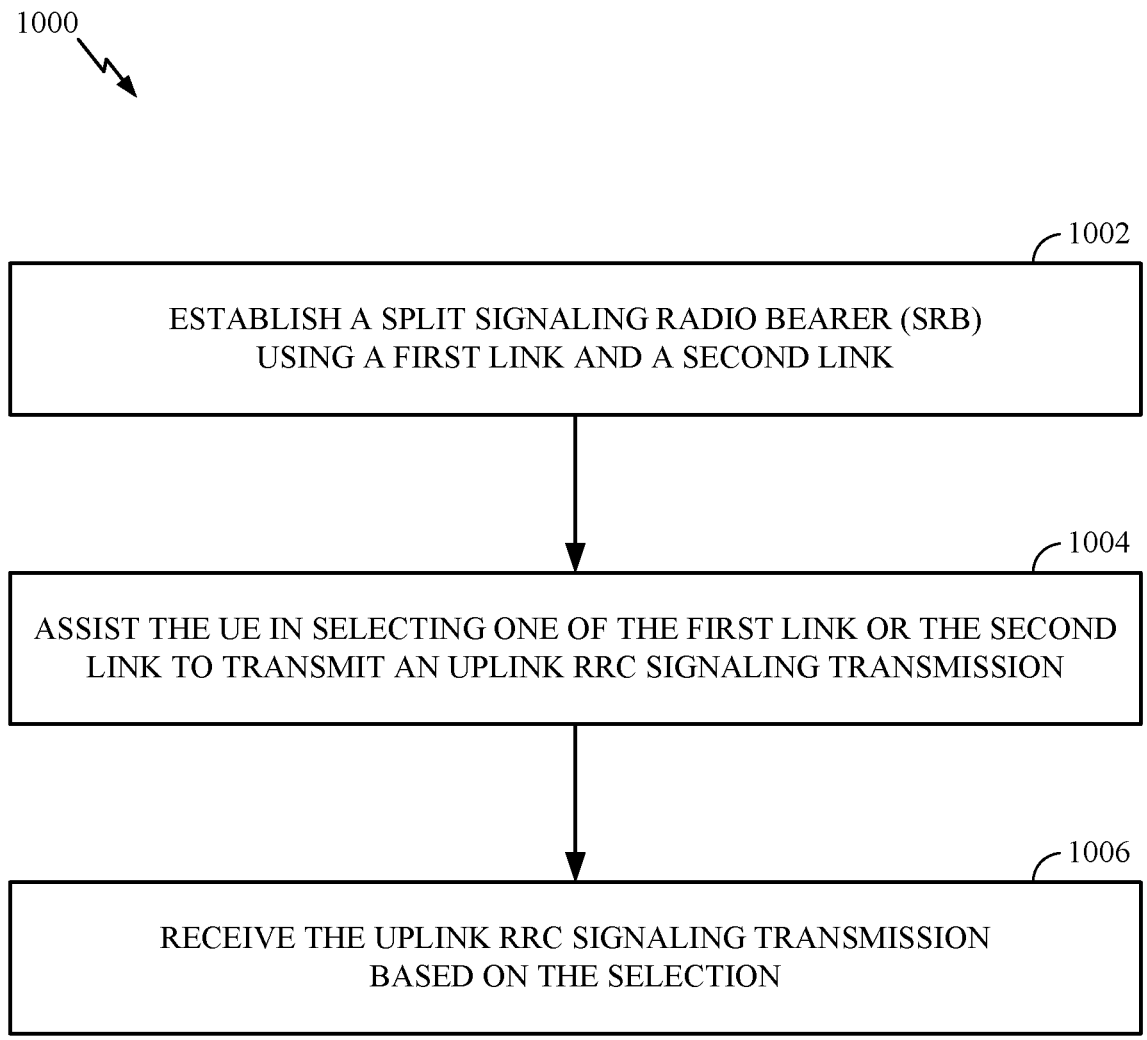
FIG. 10 illustrates example operations for wireless communications performed by a TRP, in accordance with aspects of the present disclosure.

FIG. 10 illustrates operations 1000 for wireless communications, in accordance with aspects of the present disclosure. The operations 1000 may be performed by a first RAN node 110 having one or more components illustrated in FIG. 4. The RAN node may comprise a TRP 208.

At 1002, the first TRP may establish a split signaling radio bearer (SRB) using a first link and a second link. According to aspects, the first link may be associated with the first RAN node and a second link may be associated with a second RAN node. According to aspects, a single RAN node may have established first and second links (connections) with a UE.

At 1004, the first TRP may assist the UE in selecting one of the first link or the second link to transmit an uplink RRC signaling transmission. At 1006, the first TRP may receive the uplink RRC signaling transmission based on the selection.

Figure 11:
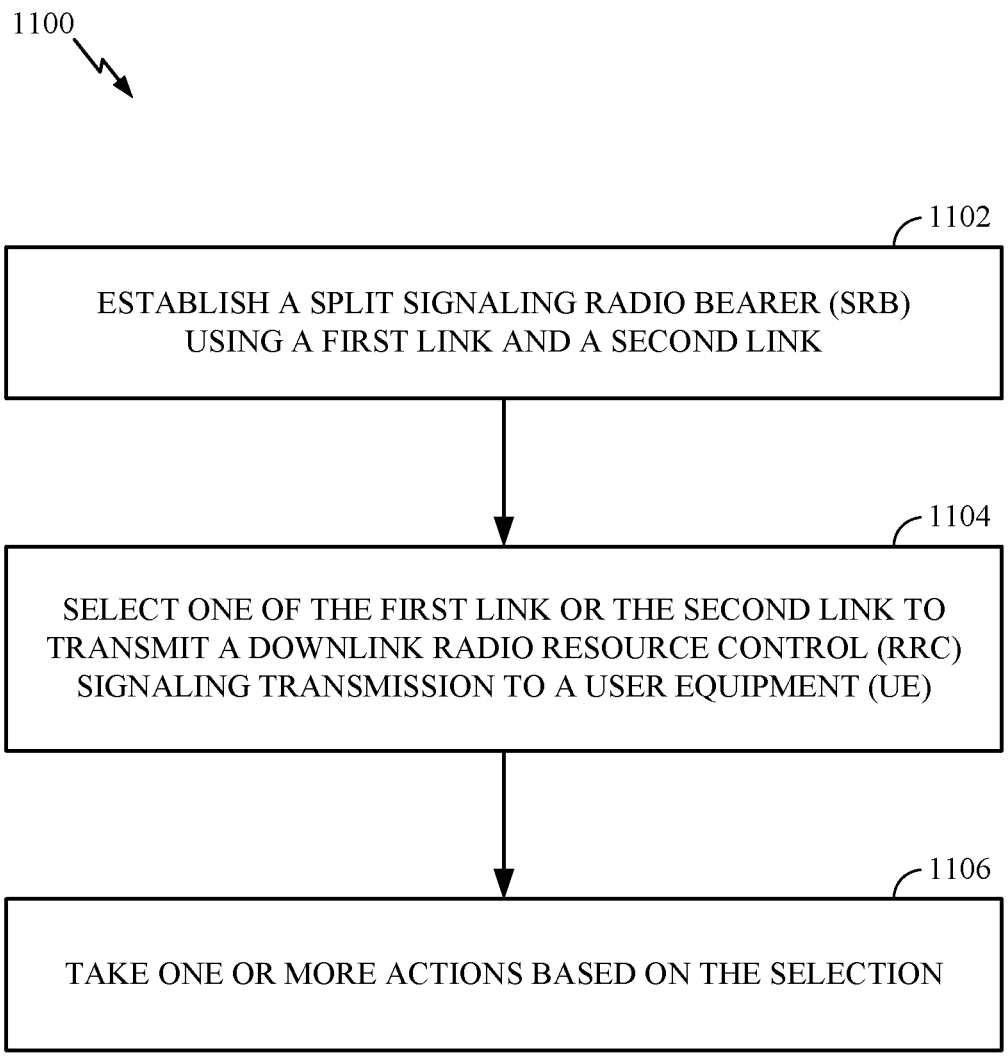
FIG. 11 illustrates example operations for wireless communication performed by a TRP, in accordance with aspects of the present disclosure.

FIG. 11 illustrates operations 1100 for wireless communications, in accordance with aspects of the present disclosure. The operations 1100 may be performed by a first RAN node 110 having one or more components illustrated in FIG. 4. The RAN node may comprise a TRP 208.

At 1102, the first RAN node may establish a split signaling radio bearer (SRB) using a first link and a second link. At 1104, the first RAN node may select one of the first link or the second link to transmit a downlink radio resource control (RRC) signaling transmission to a user equipment (UE). At 1106, the first RAN node may take one or more actions based on the selection. As described below, the first RAN node may be a master RAN node and may transmit the downlink RRC message using its resources or the first RAN node may map the downlink RRC message to a second RAN node for downlink transmission to the UE.

Figure 12:
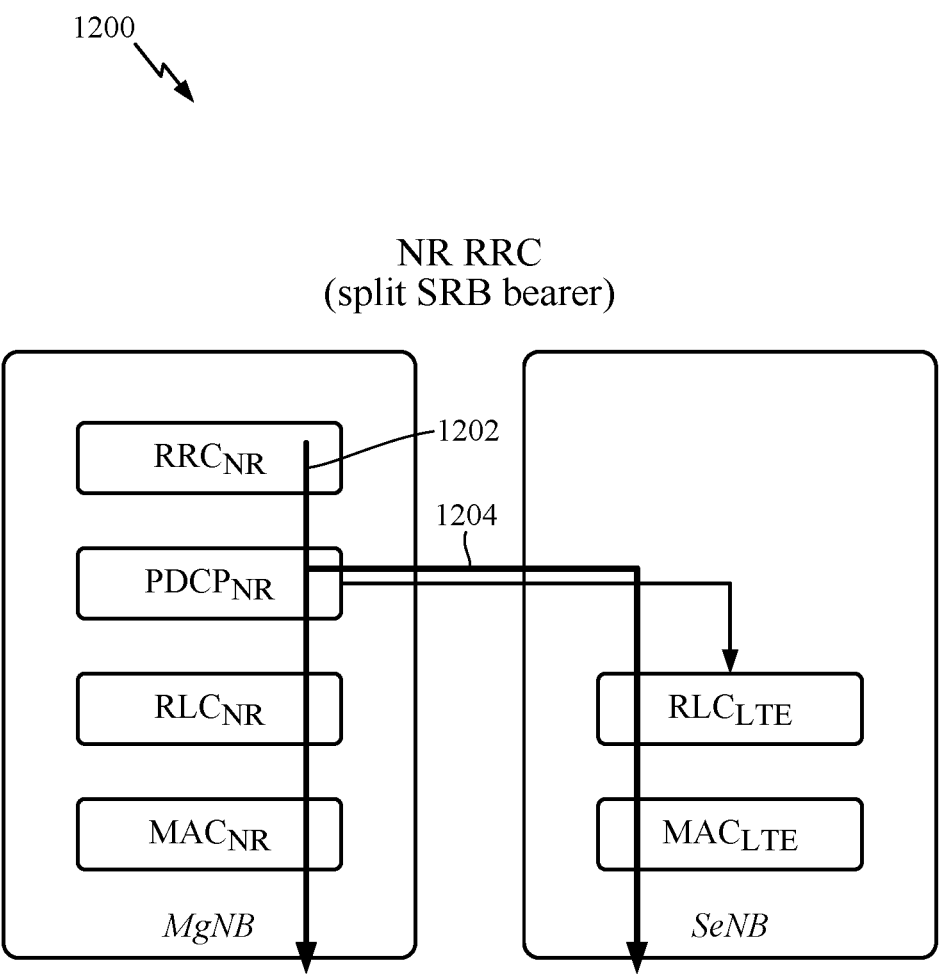
FIG. 12 illustrates an example of a split signaling radio bearer (SRB), in accordance with aspects of the present disclosure.

FIG. 12 illustrates an example 1200 of split SRB bearers, according to aspects of the present disclosure. For illustrative purposes, the master node may be a MgNB and the secondary node may be a SeNB. The SRB may be a split bearer as depicted in FIG. 12.

The link between the UE and the MgNB and link between the UE and SeNB may be referred to as a direct or indirect link depending on the end points of the SRB. For example, in the case of the RRC entity residing at the MgNB (MgNB being the SRB endpoint), the direct link 1202 uses MeNB radio resources and the indirect link 1204 uses the SeNB radio resources. Due to the split SRB, the UE and TRP may determine which link (direct or indirect) to use for transmission of the signaling messages.

According to aspects, a DC UE may determine or select which of a direct link or an indirect link to use to transmit an uplink RRC message based on one or more of a configuration, a received indication of which link to use, or state of the radio links. As described below, the configuration, indications, and states may be related. The determination or selection of which link to use to transmit an UL RRC message by the UE or and DL message by the RAN node may change over time. For example, the selection may change based on conditions of radio links, received explicit indications of which link to use, and/or a configured policy.

A configuration may refer to a threshold or a policy for a message. For example, a UE may receive a downlink signaling message via a first link. The UE may be configured to transmit a response singling message on the uplink associated with the received downlink signaling message.

For example, the UE may receive a downlink signaling message from the first TRP/RAN node using a first link or second TRP/RAN node using the second link. The first TRP may be a master TRP and the second TRP may be a secondary TRP. The UE may establish a split SRB using the first and second links. Based on the received downlink signaling message from the first TRP, the UE may determine which link to use for the uplink signaling transmission (UL RRC message). The uplink RRC signaling may be transmitted on a same link as the received downlink signaling message. According to another example, an UL RRC message may be transmitted on a link associated with the SeNB. The UE may be configured with a policy to transmit the signaling response on the uplink associated with the SeNB. The network may configure the UE with the policy.

The configuration may also refer to threshold-based configuration. The network may configure the UE with threshold values for the first and/or second link. The threshold values may be the same or different for the links. According to aspects, the UE may determine a signal quality of the first link and a signal quality of the second link. The UE may be configured to transmit uplink RRC signaling using the link associated with a higher determined signal quality. According to one example, the UE may be configured to transmit the RRC signaling message using the first link when the measured signal quality of the first link exceeds a threshold value.

When the signal quality of the first link is less than or equal to a threshold value, the UE may select the second link for the UL transmission. According to aspects, the UE may select the second link for the UL transmission when both the first link is less than or equal to a threshold value and the signal quality of the second link is greater than a threshold value.

In certain scenarios, the received downlink signaling message may include an indication of which of the first link or the second link to use for the uplink RRC signaling transmission. The UE may select the link based on the received indication in the DL signaling message. The indication may be an indirect indication wherein, as described above, the UE receives a first DL RRC message and determines the uplink link coupled with the downlink used for transmission of the first RRC message. According to aspects, the indication may be an explicit indication. For example, the UE may determine the link to use based on a flag included in a received first RRC message. The flag may include an (explicit) indication of the link to use.

The state may refer to a channel state dependent determination. The state of the radio link may include a quality of the radio link determined based on signal strength, interference level, path loss, etc. As described above, the UE may select the link having the best quality among the plurality of links, a link having a signal quality that exceeds a threshold value, a direct link when the direct link is above a threshold value, or the indirect link when (1) the direct link is below a threshold value and (2) the indirect link is above a threshold value. The network/TRPs may configure the UE with the one or more of these example threshold values.

The UE may transmit, to one of the first or second TRPs, an indication that it supports split SRB operations.

According to aspects, the UE may select an active link as opposed to a link in a low power state, such as a low power state of a discontinuous reception (DRx) cycle.

As described above, a TRP/RAN node may assist a UE in selecting a link for uplink signaling transmission. The TRP may also select one of the first link or the second link to transmit a downlink signaling transmission. The TRP (master or secondary) may assist the UE in selecting a link by configuring the UE with one or more signal quality threshold values. The signal quality threshold values may be the same or different for each of the first and second link. The UE may determine a signal quality associated with one or more of the first and second links, compare the determined signal quality with a configured threshold value, and select an UL link for transmitting the signaling message.

According to aspects, the first TRP may select one of the first link associated with the first TRP or the second link associated with the second TRP to transmit a downlink RRC signaling transmission to a UE. The first TRP may take one or more actions based on the selection. The first TRP may itself transmit the downlink RRC signaling transmission to the UE or it may route the downlink RRC signaling transmission to the second TRP for transmission via the second link.

As described above, the downlink RRC signaling transmission may include an indication of which of the first link or the second link to use for an uplink signaling message to be transmitted by the UE.

The first TRP may select which link is to be used for transmission of the DL signaling message based on a signal quality of at least one of the first link or a signal quality of the second link. The first TRP may measure the signal quality of the first link and may receive, for example, from the second TRP, measurements of the signal quality associated with the second link.

For example, when the signal quality of the first link associated with the first TRP exceeds the signal quality of the second link associated with the second TRP, the TRP may select the first link for the DL signaling transmission.

According to aspects, the first TRP may be the master TRP. When the signal quality of the first link exceeds a threshold value, the first TRP may determine to transmit the DL signaling message using the first link.

When the signal quality of the first link is less than or equal to a threshold value, the TRP may select second link. Thus, the master TRP may route the DL RRC message to the second TRP for transmission. According to aspects, the signal quality of the second link may be greater than a same or different threshold value.

As described herein, split SRB enables selecting which link to use for UL and DL transmission. Accordingly, resources associated SRBs do not have to be mapped to the MeNB on both the uplink and the downlink.

The RRC link selection methods described herein may be applied alone or in combination with the RRC entity selection methods described below. Accordingly, a UE may select a link for communicating with an RRC entity as well as an RRC entity.

Example RRC Entity Selection for RRC Messages

In DC, a single RRC entity may be provided at each of the network and the UE. On the network side, the RRC entity may reside on the MeNB. Accordingly, SRB's may be mapped to MeNB on both the uplink and downlink. The MeNB and SeNB may communicate and coordinate over the X2 interface regarding the contents of the RRC message to be provided to the UE. Due to the need for such coordination and the delays due to communication on the X2 interface, transmission of certain, time critical RRC messages may be delayed.

For example, an intra SeNB handover, wherein the target SeNB may belong to the source eNB, may require the handover message be routed over the X2 interface from SeNB to MeNB, where the RRC entity prepares the message to be transmitted to the UE. This may introduce delays in the UE receiving the handover message and the handover may fail. Note that in this case, coordination between MeNB and SeNB may not be needed since the UE only performs an intra SeNB handover.

Such delays may be overcome by introducing a second RRC entity residing in the SeNB. Accordingly, the RRC messages may be composed and transmitted directly to/by the SeNB. Similarly, a second RRC entity may be introduced at the UE. A determination or selection may be made (or provided) regarding which RRC entity to use for transmitting RRC messages.

A UE may be capable of multi-subscriber identity module (SIM) operations. Currently, the SIMs work independently of each other to manage resources associated with a respective SIM. Stated otherwise, there is no coordination or cooperation between the RRC entities of the multiple SIMs to manage resources because each RRC entity acts separately. The addition of a second RRC entity at the network side and at the UE in combination with the coordination between the multiple RRC entities for RRC entity and RRC link section support the transmission of RRC message direction to or by the SeNB, reduce transmission/reception delays, and provide flexibility for the UE and TRPs.

Figure 13:
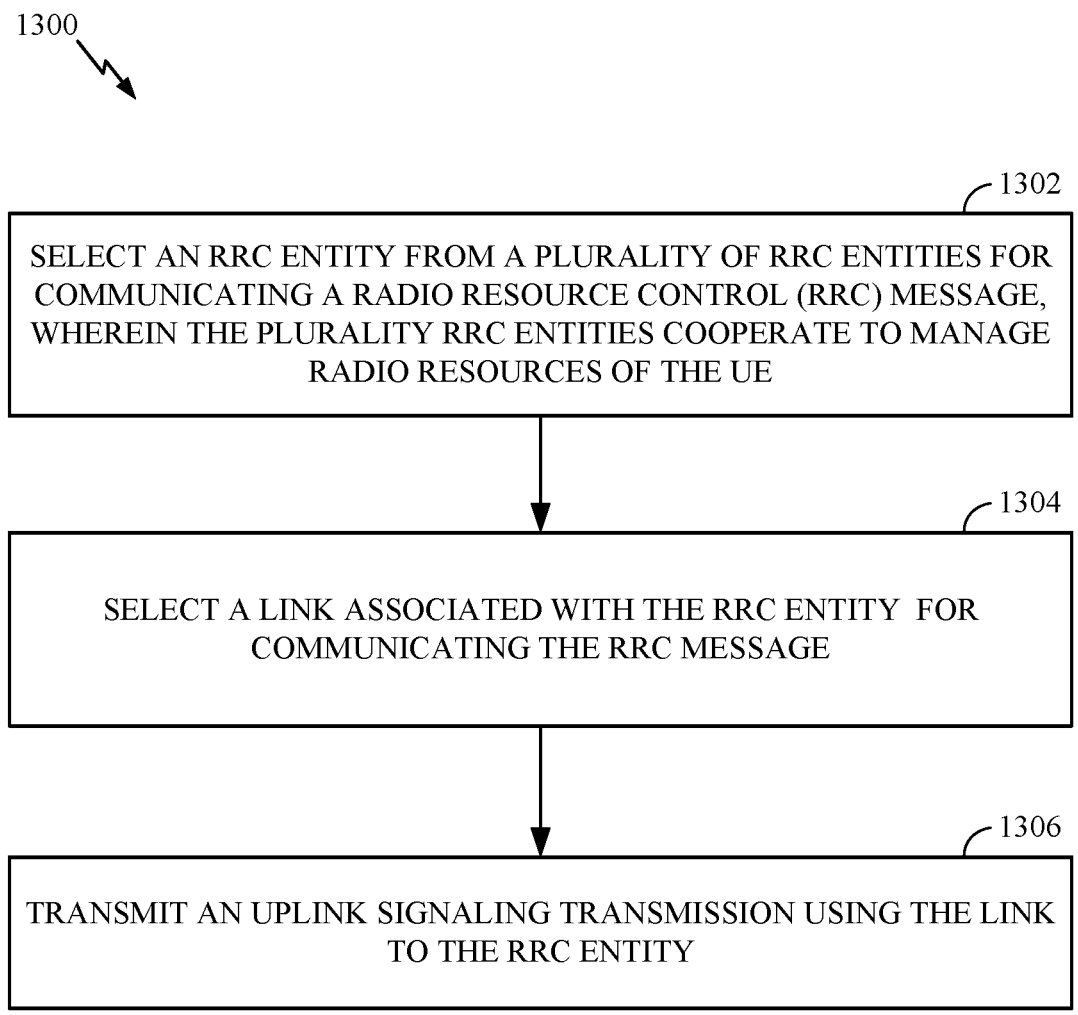
FIG. 13 illustrates example operations for wireless communication by a user equipment (UE), in accordance with aspects of the present disclosure.

FIG. 13 illustrates example operations 1300 that may be performed by a UE, in accordance with aspects of the present disclosure. The operations 1300 may be performed by a UE 120 having one or more components illustrated in FIG. 4.

At 1302, the UE may select an RRC entity from a plurality of RRC entities for communicating a radio resource (RRC) message, wherein the plurality RRC entities cooperate to manage radio resources of the UE. At 1304, the UE may select a link associated with the RRC entity for communicating the RRC message. At 1306, the UE may transmit an uplink signaling transmission using the link to the RRC entity. In an example, the uplink signaling transmission is an RRC message. According to an example, one or more of the plurality of RRC entities are included in a single TRP or in more than one TRP.

Figure 17:
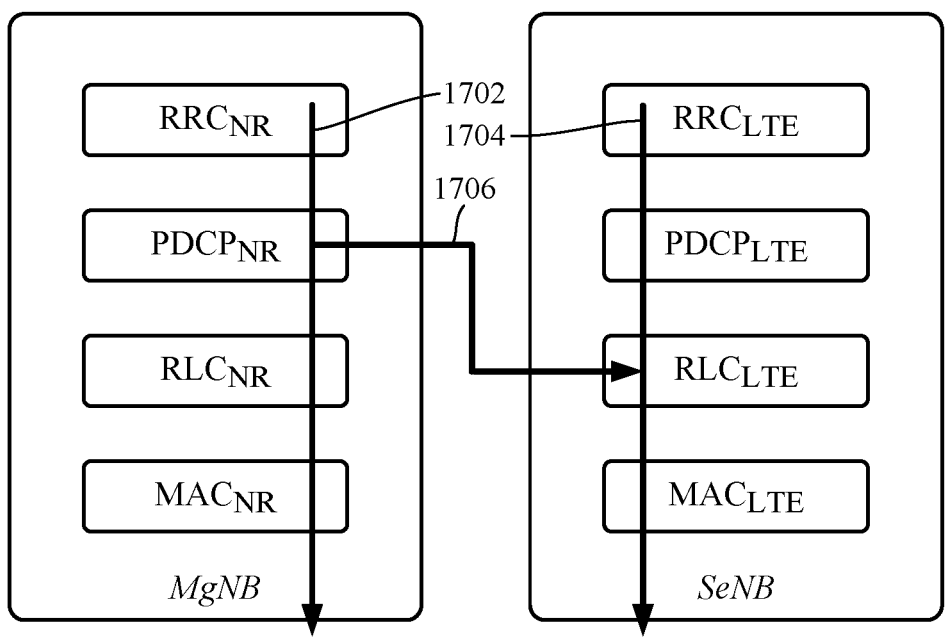
FIG. 17 illustrates an example of a radio protocol architecture for dual connectivity with dual RRC and split SRB, in accordance with aspects of the present disclosure.
Figure 18:
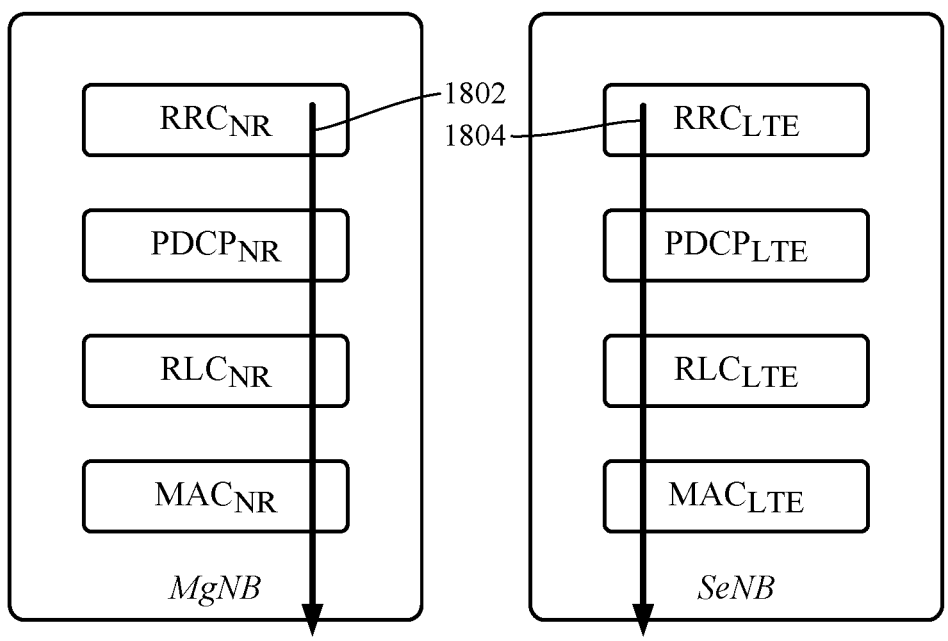
FIG. 18 illustrates an example of a radio protocol architecture for dual connectivity with dual RRC and no split SRB, in accordance with aspects of the present disclosure.

For example, and as illustrated in FIGS. 17 and 18, a second RRC entity residing in the SeNB may be introduced. In some cases, the RRC messages may be composed and transmitted directly to/by the SeNB. Accordingly, a second RRC entity may be introduced at the UE side. Then, selection of which RRC entity transmit/receiver pair to use for RRC messages may be provided.

According to an aspect, the RRC entity may be selected based on a flag in a received downlink transmission. The flag may include an indication of the RRC entity to be used to transmit an uplink signaling message message.

According to an aspect, the RRC entity may be selected based on a received downlink signaling transmission. The downlink signaling transmission may be transmitted by a first RRC entity. The UE may receive the downlink signaling transmission and selected an RRC entity for uplink transmission that is associated with and/or coupled with the RRC entity used for the received downlink signaling transmission.

According to an aspect, the RRC entity may be selected based on information that is included in uplink signaling transmission to be transmitted. For example, this may include selecting the receiving RRC entity based on a need by the receiving RRC entity for the information contained in the uplink signaling transmission message.

Figure 14:
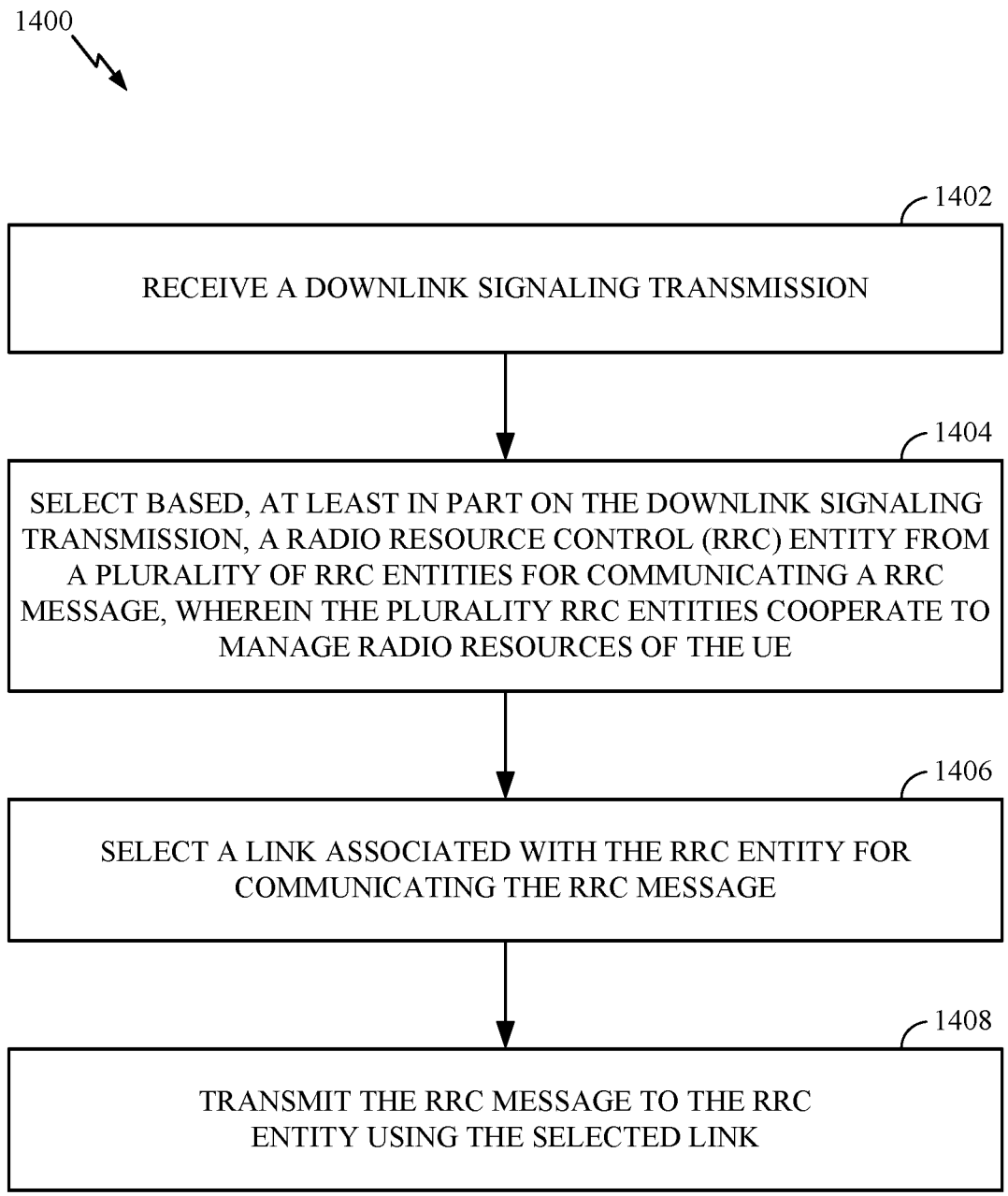
FIG. 14 illustrates example operations for wireless communication by a user equipment (UE), in accordance with aspects of the present disclosure.

FIG. 14 illustrates example operations 1400 that may be performed by a UE, in accordance with aspects of the present disclosure. The operations 1400 may be performed by a UE 120 having one or more components illustrated in FIG. 4.

At 1402, the UE may receive a downlink signaling transmission. At 1404, the UE may select based, at least in part on the downlink signaling transmission, a RRC entity from a plurality of RRC entities for communicating a RRC message, wherein the plurality RRC entities cooperate to manage radio resources of the UE.

At 1406, the UE may select a link associated with the RRC entity for communicating the RRC message. At 1408, the UE may transmit the RRC message to the RRC entity using the selected link.

According to aspects, as described above, the UE may establish a first link and a second link. The first link may be established with a first RRC entity and a second link may be established with a second RRC entity. The entities may be at a same or different RAN node. The UE may establish a split SRB using the first link and the second link.

The UE may receive assistance information from at least one of the first link or the second link. The assistance information may directly or indirectly indicate which of the first link or the second link to select to transmit the RRC message to the selected RRC entity. Accordingly, in one example, the UE may select the link associated with the RRC entity for communicating the RRC message is based, at least in part, on the received assistance information.

According to aspects, the assistance information comprises a downlink signaling message. The UE may select the link associated with the RRC entity for communicating the RRC message is based, at least in part, on the received downlink signaling message.

In one example of the assistance information providing an indirect indication of which link to select, the UE may be configured to transmit the UL RRC a same link as the received downlink signaling.

In one example of the downlink signaling providing an explicit indication of which link to select, the downlink signaling message may include an indication of which of the first link or the second link to use for transmitting the RRC message to the RRC entity. The UE may select the link associated with the RRC entity for communicating the RRC message is based, at least in part, on the indication.

According to an example, the assistance information comprises a policy indicating the UE should select one of the first or second links based, at least in part, on a determined signal quality of at least one of the first and second links.

In an effort to save power and time, the UE may select a link that is active. Accordingly, the UE may avoid selecting an RRC link that is in a sleep, idle or in a low-power state, such as a low power state of a discontinuous reception (DRx) cycle. Instead, the UE may select an active link (e.g., a link that is not in a low power state).

Figure 15:
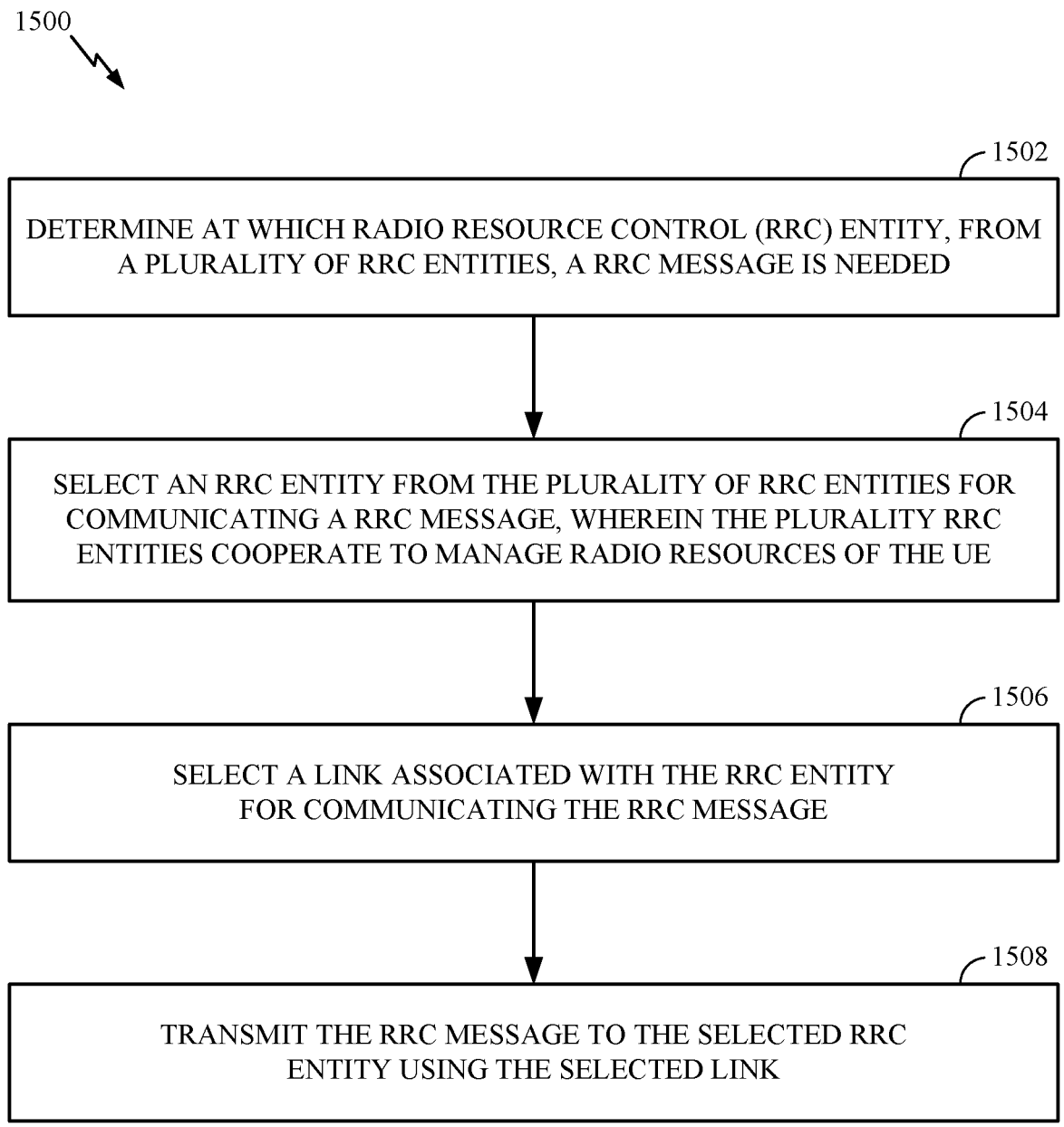
FIG. 15 illustrates example operations for wireless communication by a user equipment (UE) in accordance with aspects of the present disclosure.

FIG. 15 illustrates example operations 1500 that may be performed by a UE, in accordance with aspects of the present disclosure. The operations 1500 may be performed by a UE 120 having one or more components illustrated in FIG. 4.

At 1502, the UE may determine at which radio resource control (RRC) entity, from a plurality of RRC entities, signaling RRC message is desired (intended or needed). For example, the UE may determine the intended recipient for the uplink signaling message.

At 1504, the UE may select an RRC entity from the plurality of RRC entities for communicating the RRC message, wherein the plurality RRC entities cooperate to manage radio resources of the UE. At 1506, the UE may select a link associated with the RRC entity for communicating the RRC message. At 1508, the UE may transmit the RRC message to the RRC entity using the selected link.

According to aspects, the UE may establish a first link and a second link with same or different RAN nodes. The UE may establish a split SRB using the first link and the second link. The UE may receive assistance information from at least one of the first link or the second link regarding which of the first link or the second link to select to transmit the RRC message to the selected RRC entity. The UE may select the link based on the assistance information.

The assistance information may include a downlink signaling message. The UE may select the link associated with the RRC entity for communicating the RRC message based, at least in part, on the received downlink signaling message. As an example, the UE may transmit the RRC message on a same link as the received downlink signaling message.

According to aspects, the downlink signaling message comprises an indication of which of the first link or the second link to use for transmitting the RRC message to the RRC entity. The UE may select the ink associated with the RRC entity.

According to aspects, the assistance information comprises a policy indicating the UE should select one of the first or second links based, at least in part, on a determined signal quality of at least one of the first and second links.

As described above, the UE may select an active link as opposed to a link that is in a low power state of, for example, a DRx cycle.

Figure 16:
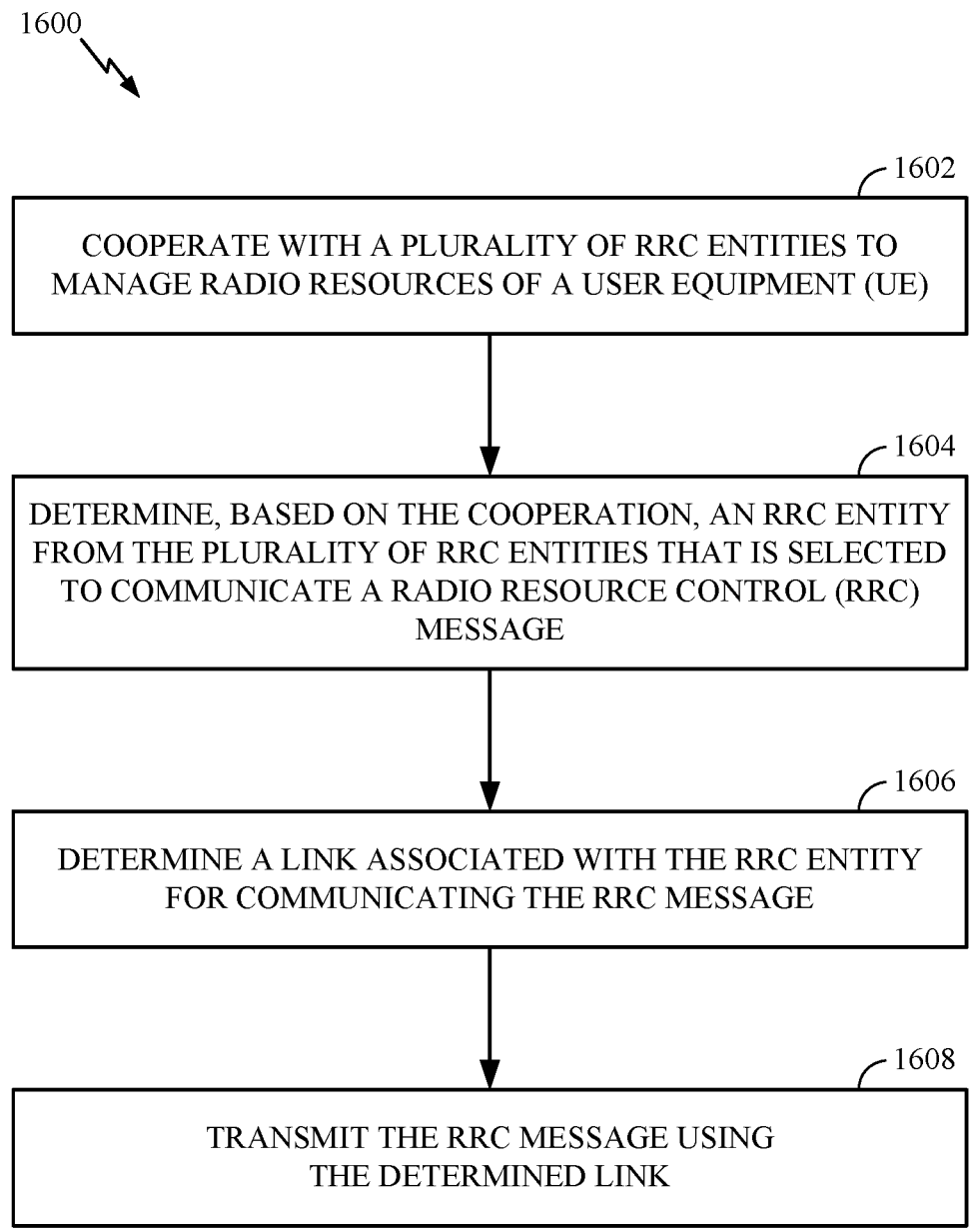
FIG. 16 illustrates example operations for wireless communications by a transmit/receive point (TRP), in accordance with aspects of the present disclosure.

FIG. 16 illustrates operations 1600 which may be performed by a transmit/receive point (TRP), in accordance with aspects of the present disclosure. The operations 1600 may be performed by a first TRP 110 having one or more components illustrated in FIG. 4.

At 1602, the TRP may cooperate with a plurality of RRC entities to manage radio resources of a user equipment (UE). At 1604, the TRP may determine, based at least in part, on the cooperation, an RRC entity from the plurality of RRC entities to communicate a radio resource control (RRC) message. As an example, the TRP may determine an RRC entity from the plurality of RRC entities at one or more TRPs selected to communicate a DL RRC message to an RRC entity at the UE.

As an example, the RRC entities at one or more TRPs may communicate via backhaul links. Each RRC entity may be managing resources for its own link to the UE. Additionally, the RRC entities may cooperate by exchanging messages to manage overall resources, such as overall network or UE resources.

As an example, the RRC entities may manage the overall traffic or throughput that may be schedule to the UE at a same time. Thus, the RRC entities may communicate and coordinate regarding the throughput each RRC entity may transmit to the UE, such that the sum of the throughput over each from each of the RRC entities does not exceed a threshold amount. The RRC entities may communicate and cooperate regarding other UE capabilities as well. For example, the RRC entities may communicate and select an RRC entity for transmission/reception based on the UE's carrier aggregation capabilities or support of component carriers across links associated with each of the RRC entities. The RRC entities may coordinate regarding mobility management of the links associated with each of the RRC entities.

At 1606, the TRP may determine a link associated with the RRC entity for communicating the RRC message. As an example, the RRC message may be a DL RRC message. At 1608, the TRP may transmit a downlink signaling transmission using the determined link.

According to aspects, the downlink signaling transmission includes a flag indicating a specific RRC entity from the plurality of RRC entities as the RRC entity to communicate the RRC message.

According to aspects, determining the RRC entity comprises receiving an uplink signaling transmission from a first RRC entity and determining the selected RRC entity associated with the first RRC entity. As an example, the selected RRC entity may correspond with RRC entity at the UE that transmitted the uplink signaling transmission.

According to aspects, selecting the RRC entity may include determining at which RRC entity from the plurality of RRC entities information in the downlink signaling transmission is needed and selecting the RRC entity from the plurality of RRC entities based on the determination.

As described above, the TRP may cooperate with the plurality of RRC entities to manage radio resources by exchanging message via backhaul links. The message may include information related to, for example, UE capability, maximum throughput, handovers, etc.

For example, in accordance with one or more cases, a second RRC entity residing in the SeNB may be introduced as depicted in FIG. 17 and FIG. 18. Specifically, FIG. 17 illustrates an example 1700 of a radio protocol architecture for dual connectivity with dual RRC and split SRB, in accordance with aspects of the present disclosure. As illustrated each of the MgNB and SeNB have a respective RRC entity. Therefore, the UE may have a direct link with both the MgNB via link 1702 and with the SeNB via links 1704. Additionally, a split SRB bearer may be present as shown at 1706.

FIG. 18 illustrates an example 1800 of a radio protocol architecture for dual connectivity with dual RRC and no split SRB, in accordance with aspects of the present disclosure. As illustrated, a UE may have a direct link with the MgNB via link 1802 and the UE may have a direct link with the SeNB via link 1804.

In some cases, the RRC messages may be composed and transmitted directly to/by the SeNB. Accordingly, a second RRC entity may be introduced at the UE side. For example, the UE may have two RRC entities, one associated with each of the MgNB and SeNB. Then, selection of which RRC entity transmit/receiver pair to use for RRC messages may be provided.

For example, in accordance with one or more cases, a method to determine which RRC entity to use to transmit an RRC message is provided. According to an aspect, the method may include determining an RRC entity from a plurality of RRC entities at a TRP to transmit an RRC message, where the plurality of RRC entities cooperate for managing the radio resources of the device. The method may also include determining a link associated with the determined RRC entity to transmit a DL RRC message and transmitting a downlink signaling transmission using the link.

According to an example, selecting the RRC entity (from a plurality of RRC entities at the TRP) may be based on a flag transmitted by the TRP to the UE. As an example, the UE may receive a first RRC message, and determine the RRC entity to select based on a flag included in the received RRC message. The flag may include an indication of the RRC entity to be used to transmit the message and/or an indication of the RRC entity to use to receive a DL RRC message.

According to another example, the RRC entity may be selected based on where the first, UL RRC message came from. The TRP may receive a first RRC message transmitted by an RRC entity at the UE. The TRP may determine the RRC entity at the TRP that is associated with, and/or coupled with, the UE's RRC entity used for transmission of the first DL RRC message.

According to another example, the RRC entity may be selected based on information included in a DL RRC message. For example, the TRP may determine which RRC receiving entity the RRC message, or information contained in the message, is intended for. Stated otherwise, the TRP may determine the intended RRC entity for the to-be transmitted DL RRC message and may select its RRC entity accordingly.

According to an example, each of a plurality of RRC entities may correspond to a different RAT. The plurality of RRC entities may transmit an RRC message for mobility on one RAT using the RRC entity corresponding to that RAT. According to an example, a UE may determine which RRC entity to transmit an RRC message based on the contents of the RRC message. If the message comprises a mobility management message associated with the UE moving from a first RAT to a second RAT, the UE may select the RRC entity associated with the first RAT to transmit the RRC message.

More generally, a first RAT may be associated with a first RRC entity and a second RAT may be associated with a second RRC entity. The RRC entity at the UE corresponding to the RAT associated with the mobility event is selected for transmitting the RRC message. Therefore, when the mobility management message is associated with, for example, the first RAT, the UE may select the RRC entity associated with the first RAT to transmit the RRC message. The mobility event may include handover or other mobility events which are associated with transmission of an RRC message.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of a list of" items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone;

B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Generally, where there are operations illustrated in Figures, those operations may be performed by any suitable corresponding counterpart means-plus-function components. As an example, one or more of the components of the BS 110 and the UE 120 illustrated in FIG. 4 may be configured to perform means corresponding to the (method) steps described herein. Accordingly, one or more components of the BS 110 and UE 120 may be used to practice aspects of the present disclosure. For example, antennas 452, modulator/demodulator 454, processors 466, 458, 464, and/or controller/processor 480 of the UE 120 and/or antennas 434, modulator, demodulator 432, processors 420, 430, 438, and/or controller/processor 440 of the BS 110 may be used to perform the operations described herein and illustrated with reference to FIGS. 9-11 and 13-16 such as, means for means for receiving, means for selecting, means for transmitting, means for establishing, means for determining, means for cooperating, and means for exchanging.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files.

Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE) comprising:
    receiving a downlink signaling transmission;
    selecting based, at least in part on the downlink signaling transmission, a radio resource control (RRC) entity from a plurality of RRC entities for communicating a RRC message, wherein the plurality RRC entities cooperate to manage radio resources of the UE;
    establishing a first link and a second link;
    establishing a split signaling radio bearer (SRB) using the first link and the second link;
    receiving assistance information from at least one of the first link or the second link regarding which of the first link or the second link to select to transmit the RRC message to a selected RRC entity,
    selecting a link associated with the RRC entity for communicating the RRC message based, at least in part, on the received assistance information; and
    transmitting the RRC message to the selected RRC entity using the selected link.

2. The method of claim 1, wherein the downlink signaling transmission comprises a flag indicating a specific RRC entity from the plurality of RRC entities,
    wherein selecting the RRC entity is based, at least in part, on the flag.

3. The method of claim 1,
    wherein the downlink signaling transmission is received from a first RRC entity; and
    wherein selecting the RRC entity comprises selecting the first RRC entity as the RRC entity for communicating the RRC message.

4. The method of claim 1,
    wherein the assistance information comprises a downlink signaling message, and
    wherein selecting the link associated with the RRC entity for communicating the RRC message is based, at least in part, on the received downlink signaling message.

5. The method of claim 4, wherein the RRC message is transmitted on a same link as the received downlink signaling message.

6. The method of claim 4,
    wherein the downlink signaling message comprises an indication of which of the first link or the second link to use for transmitting the RRC message to the RRC entity, and
    wherein selecting the link associated with the RRC entity for communicating the RRC message is based, at least in part, on the indication.

7. The method of claim 1, wherein the assistance information comprises a policy indicating the UE should select one of the first or second links based, at least in part, on a determined signal quality of at least one of the first and second links.

8. The method of claim 1, wherein selecting the link associated with the RRC entity for communicating the RRC message comprises:
selecting an active link associated with the RRC entity.

9. A method for wireless communications by a user equipment (UE) comprising:
determining at which radio resource control (RRC) entity, from a plurality of RRC entities, an RRC message is needed;
selecting an RRC entity from the plurality of RRC entities for communicating the RRC message, wherein the plurality RRC entities cooperate to manage radio resources of the UE;
establishing a first link and a second link;
establishing a split signaling radio bearer (SRB) using the first link and the second link;
selecting a link associated with the RRC entity for communicating the RRC message, wherein selecting the link comprises receiving assistance information comprising a policy indicating the UE should select one of the first link or a second link based, at least in part, on a determined signal quality of at least one of the first and second links; and
transmitting the RRC message to the selected RRC entity using the selected link.

10. The method of claim 9, wherein determining at which RRC entity the RRC message is needed is based, at least in part, on contents of the RRC message.

11. The method of claim 9, wherein:
a first RRC entity of the plurality of RRC entities is associated with a first radio access technology (RAT), and a second RRC entity of the plurality of RRC entities is associated with a second RAT,
the RRC message comprises a mobility management message associated with the first RAT, and
selecting the RRC entity comprises selecting the RRC entity associated with the first RAT.

12. The method of claim 9, wherein the policy indicates the UE should select the link having a higher determined signal quality, and further comprising:
determining a signal quality of the first link and a signal quality of the second link, and
selecting the first link.

13. The method of claim 9, wherein the assistance information comprises at least one threshold value associated with a signal quality of the first or second links.

14. The method of claim 13, further comprising:
determining a signal quality of the first link exceeds the threshold value associated with the first link, wherein the first link is associated with a master radio access network (RAN) node, and
selecting the first link.

15. The method of claim 13, further comprising:
determining a signal quality of the first link is less than or equal to the threshold value associated with the first link,
determining a signal quality of the second link is greater than or equal to the threshold value associated with the second link; and
selecting the second link.

16. The method of claim 9, wherein selecting the link associated with the RRC entity for communicating the RRC message comprises:
selecting an active link associated with the RRC entity.

17. A method for wireless communications by a master transmit/receive point (TRP) comprising:
cooperating with a plurality of radio resource control (RRC) entities to manage radio resources of a user equipment (UE), wherein at least one of the plurality of RRC entities resides at the master TRP and at least one of the plurality of RRC entities resides at a secondary TRP;
determining based, at least in part, on the cooperation, an RRC entity from the plurality of RRC entities that is selected to communicate a radio resource control (RRC) message;
determining a link associated with the RRC entity for communicating the RRC message; and
transmitting a downlink signaling transmission using the determined link, wherein the transmitting comprises transmitting, to the UE, a flag indicating the determined RRC entity from the plurality of RRC entities as the RRC entity to transmit the downlink signaling message, wherein the downlink signaling message comprises the downlink RRC message.

18. The method of claim 17, wherein determining the RRC entity comprises:
receiving, from the UE, a uplink signaling transmission from a first RRC entity at the UE; and
determining the selected RRC entity associated with the first RRC entity.

19. The method of claim 17,
wherein cooperating with the plurality of RRC entities to manage radio resources of the UE comprises exchanging one or more messages via backhaul signaling to manage the radio resources.

20. An apparatus for wireless communications by a user equipment (UE) comprising:
at least one processor configured to:
receive a downlink signaling transmission;
select based, at least in part, on the downlink signaling transmission radio resource control (RRC) entity from a plurality of RRC entities for communicating a RRC message, wherein the plurality RRC entities cooperate to manage radio resources of the UE;
establish a first link and a second link;
establish a split signaling radio bearer (SRB) using the first link and the second link; and
receive assistance information from at least one of the first link or the second link regarding which of the first link or the second link to select to transmit the RRC message to the selected RRC entity
select a link associated with the RRC entity for communicating the RRC message based, at least in part, on the received assistance information; and
transmit the RRC message to the selected RRC entity using the selected link; and
a memory coupled to the at least one processor.

21. The apparatus of claim 20,
wherein the downlink signaling transmission comprises a flag indicating a specific RRC entity from the plurality of RRC entities, and
wherein the at least one processor is configured to select the RRC entity based, at least in part, on the flag.

22. The apparatus of claim 20,
wherein the downlink signaling transmission is received from a first RRC entity, and
wherein the at least one processor is configured to select the RRC entity by selecting the first RRC entity as the RRC entity for communicating the RRC message.

23. The apparatus of claim 20,
wherein the assistance information comprises a downlink signaling message, and
wherein the at least one processor is configured to select the link associated with the RRC entity for communicating the RRC message is based, at least in part, on the received downlink signaling message.

24. The apparatus of claim 23, wherein the RRC message is transmitted on a same link as the received downlink signaling message.

25. The apparatus of claim 20, wherein the assistance information comprises a policy indicating the UE should select one of the first or second links based, at least in part, on a determined signal quality of at least one of the first and second links.

* * * * *